UNITED STATES PATENT OFFICE.

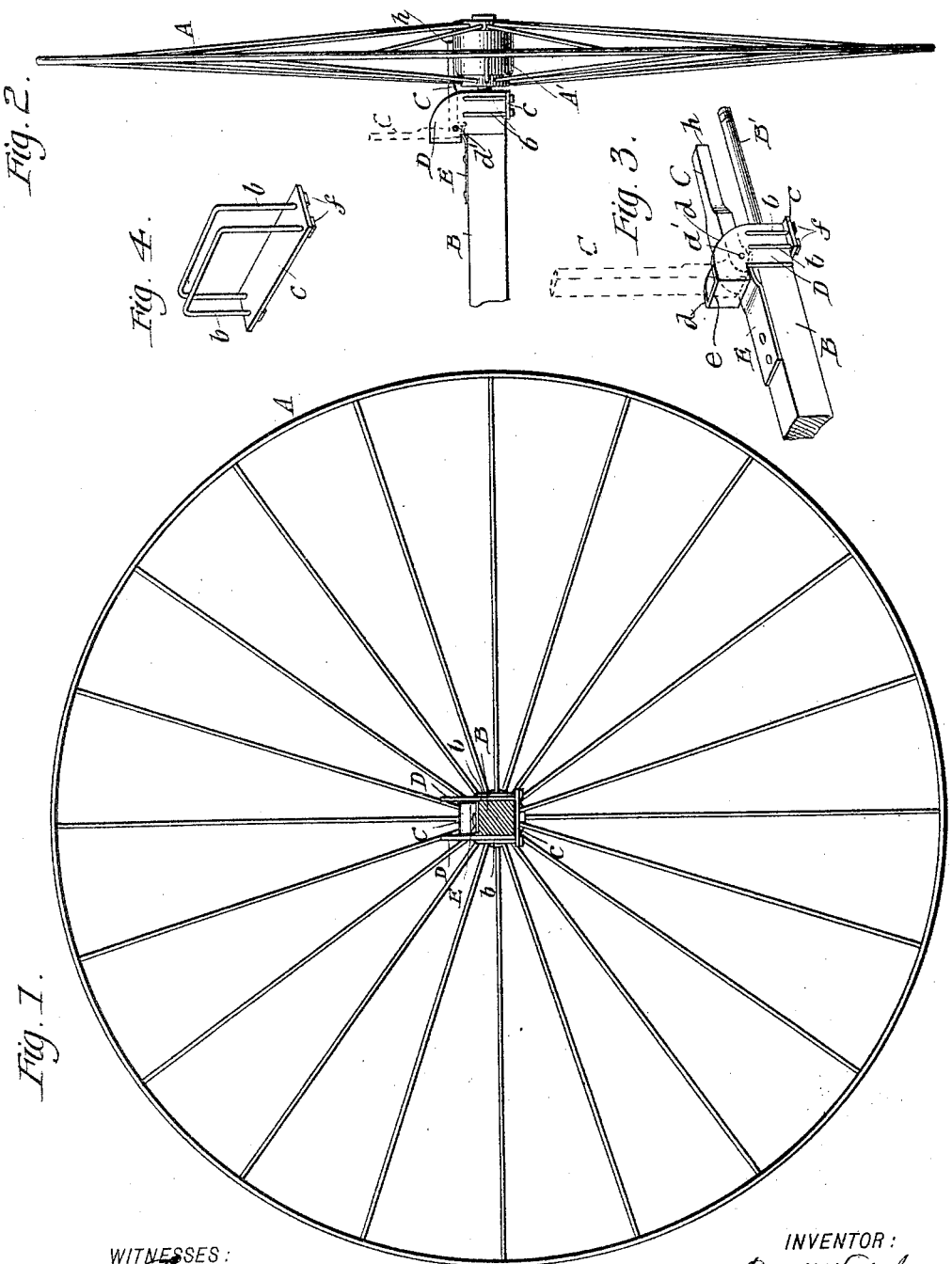

ROY W. WELCH, OF LEXINGTON, NEBRASKA.

BRAKE FOR BABY-CARRIAGES.

SPECIFICATION forming part of Letters Patent No. 437,826, dated October 7, 1890.

Application filed December 14, 1889. Serial No. 333,733. (No model.)

*To all whom it may concern:*

Be it known that I, ROY W. WELCH, of Lexington, in the county of Dawson and State of Nebraska, have invented a new and useful Improvement in Brakes for Baby-Carriages, of which the following is a full, clear, and exact description.

My invention relates to an improvement in brakes for baby-carriages, the object being to provide a simple and convenient locking device which will afford means for preventing the rotation of the wheel it is applied to, and thus hold the vehicle stationary when desired.

With this object in view my invention consists in the construction and combination of parts, as hereinafter described, and pointed out in the claim.

Reference is to be had to the accompanying drawings, forming a part of this specification, in which similar letters of reference indicate corresponding parts in all the figures.

Figure 1 is a side elevation of a wheel, a cross-section of an axle on which the wheel is placed, and the locking device or brake in position on the axle. Fig. 2 is an edge view of a wheel in elevation, a portion of an axle attached thereto, and the brake mechanism secured upon the axle, the same being shown in locked position in full lines and removed from contact with the wheel in dotted lines. Fig. 3 is an enlarged view of a portion of an axle having the brake mechanism secured thereon, the vehicle-wheel being removed; and Fig. 4 is an enlarged perspective view of a keeper-plate and looped bolts, which are preferred as a means for securing the brake device upon the axle.

A represents a wheel of a child's carriage, and B an axle therefor, having a projecting metal spindle B' for reception of the wheel. Upon the axle B, adjacent to the inner end of the wheel-hub A', a metal bracket-shoe D is mounted. This shoe is preferably made as shown, although its design may be varied. It consists, essentially, of two parallel flanges $d$, which are spaced apart the lateral thickness of the axle they are made to embrace on its opposite sides, and are thus retained by an integral wall $e$. (See Fig. 3.)

The bracket-shoe D is held in place on the axle near its end by the loop-bolts $b$, which are introduced in opposite orifices formed in the flanges $d$, and bent downwardly, so as to embrace these vertical walls. Their lower portions, being threaded, extend below the axle-body when in place, and are introduced in perforations made in the keeper-plate $c$, which plate is caused to clamp the bracket-shoe upon the axle by the nuts $f$, that engage the bolt ends and bear on the plate.

Between the flanges $d$ of the shoe D a finger-bar C is pivoted, as at $d'$, (see Figs. 2 and 3,) near its inner end, the free end $h$ projecting in an outward direction through the space between the spokes of the wheel when it is so adjusted.

A sufficient opening is afforded below the lower edge of the integral wall $e$ of the bracket-shoe D, to permit the plate-spring E to be inserted therein and have a proper vertical play at its free end.

The inner end of the spring E is secured by screws or other means to the axle-body and its opposite end is introduced below the heel of the finger-bar C.

As the pivotal point $d'$ of the finger-bar is near the rear end of the same, which end is slightly rounded on one edge, as shown, it is evident that the bar may be elevated at a right angle to the axle-body and rest against the wall $e$, or be folded down and project between the spokes of the wheel A, the spring E yielding sufficiently to allow such an adjustment to be effected and by its tensional force exerted on the surface of the bar holding the same in either position until a change is designedly made.

Having thus described my invention, what I claim as new, and desire to secure by Letters Patent, is—

In a wheel-brake for a baby-carriage, the combination, with a wheel and an axle, of a bracket-shoe clipped to the axle, a finger-bar pivoted between the flanges of the bracket-shoe, so that it may be folded from an upright position to lie between two spokes of the wheel, and a plate-spring secured upon the axle and projected below and against the heel of the finger-bar to retain it normally upright, substantially as set forth.

ROY W. WELCH.

Witnesses:
J. L. MAY,
B. C. HYDE.